United States Patent
Liston et al.

(10) Patent No.: US 7,191,880 B2
(45) Date of Patent: *Mar. 20, 2007

(54) OVER-RUNNING CLUTCH PULLEY WITH INCREASED SURFACE MICROHARDNESS

(75) Inventors: Mary-Jo Liston, Whitmore Lake, MI (US); John Miller, Jackson, MI (US); Robert Frayer, Jr., Gregory, MI (US); Randall King, Kingwood, TX (US); Russell Monahan, Ann Arbor, MI (US); William Allison, Clifton Park, NY (US)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/381,773

(22) PCT Filed: May 31, 2001

(86) PCT No.: PCT/US01/17642

§ 371 (c)(1),
(2), (4) Date: Feb. 2, 2004

(87) PCT Pub. No.: WO01/92747

PCT Pub. Date: Dec. 6, 2001

(65) Prior Publication Data

US 2004/0112700 A1 Jun. 17, 2004

Related U.S. Application Data

(60) Provisional application No. 60/208,244, filed on May 31, 2000.

(51) Int. Cl.
*F16D 41/20* (2006.01)
*F16D 13/12* (2006.01)
*F16H 55/48* (2006.01)

(52) U.S. Cl. .................. 192/41 S; 29/892; 192/107 M; 192/107 T

(58) Field of Classification Search ............... 192/41 S, 192/107 T, 75, 76, 107 R, 107 M, 81 C; 474/170, 171, 166, 74; 29/892, 892.1
See application file for complete search history.

(56) References Cited

U.S. PATENT DOCUMENTS 3,886,637 A * 6/1975 Ellis et al. ............. 29/888.061

(Continued)

FOREIGN PATENT DOCUMENTS

JP 56-14653 A * 2/1981

(Continued)

*Primary Examiner*—Rodney H. Bonck
(74) *Attorney, Agent, or Firm*—Brinks Hofer Gilson & Lione

(57) ABSTRACT

The over-running clutch pulley (10) of a preferred embodiment of the invention includes a sheave member (20), a hub member (22) located substantially concentrically within the sheave member, and a clutch member (24), which cooperate to rotationally engage an input device (12) and an output device (14). The sheave member preferably includes a sheave input section (26) adapted to engage the input device, and a sheave clutch section (28) defining a sheave clutch surface (30). Similarly, the hub member preferably includes a hub output section (32) adapted to engage the output device, and a hub clutch section (34) defining a hub clutch surface (36). In the preferred embodiment, either the sheave clutch surface, the hub clutch surface, or both, have a surface microhardness greater than the hub output section.

22 Claims, 2 Drawing Sheets

U.S. PATENT DOCUMENTS

| | | | |
|---|---|---|---|
| 4,189,039 A * | 2/1980 | Johnson | 192/81 C |
| 5,288,683 A * | 2/1994 | Nakashima et al. | 192/107 M |
| 5,598,913 A * | 2/1997 | Monahan et al. | 192/41 S |
| 5,797,819 A * | 8/1998 | Arai | 474/166 |
| 6,394,247 B1 * | 5/2002 | Monahan et al. | 192/41 S |

FOREIGN PATENT DOCUMENTS

| | | | |
|---|---|---|---|
| JP | 60-98223 A | * | 6/1985 |
| JP | 63-225761 A | * | 9/1988 |

* cited by examiner

OVER-RUNNING CLUTCH PULLEY WITH INCREASED SURFACE MICROHARDNESS

CROSS-REFERENCE TO RELATED APPLICATIONS

The present application is a U.S. national phase application of international application No. PCT/US01/17642, filed 31 May 2001, which claims priority to U.S. application No. 60/208,244, filed 31 May 2000.

TECHNICAL FIELD

This invention relates generally to devices in the over-running clutch field, and more specifically to an improved over-running clutch pulley for use with an accessory device driven by an automotive engine with a belt drive.

BACKGROUND

During the operation of an automotive engine, a drive belt is typically used to power and operate various accessory devices. One of these accessory devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various accessories devices (the "input device").

Most conventional driven pulleys are made from a one-piece design with no over-running capabilities. In other words, the conventional driven pulleys are rigidly mounted to the input shaft and are incapable of allowing relative rotational movement between any section of the driven pulley and the input shaft. As a result of the lack of any over-running capabilities and of the generation of significant inertia by the accessory, relative slippage between the drive belt and the driven pulley may occur if the drive belt suddenly decelerates relative to the input shaft. The relative slippage may cause an audible squeal, which is annoying from an auditory standpoint, and an undue wear on the drive belt, which is undesirable from a mechanical standpoint.

In a typical driving situation, the drive belt may experience many instances of sudden deceleration relative to the input shaft. This situation may occur, for example, during a typical shift from first gear to second gear under wide open throttle acceleration. This situation is worsened if the throttle is closed or "back off" immediately after the shift. In these situations, the drive belt decelerates very quickly while the driven pulley, with the high inertia from the accessory device, maintains a high rotational speed, despite the friction between the drive belt and the driven pulley.

In addition to the instances of sudden deceleration, the drive belt may experiences other situations that cause audible vibration and undue wear. As an example, a serpentine arrangement with conventional driven pulleys may be used with an automobile engine that has an extremely low idle engine speed (which may increase fuel economy). In these situations, the arrangement typically experiences "belt flap" of the drive belt as the periodic cylinder firing of the automotive engine causes the arrangement to resonate within a natural frequency and cause an audible vibration and an undue wear on the drive belt.

The disadvantage of the conventional driven pulleys, namely the audible squeal, the undue wear, and the vibration of the drive belt, may be avoided by the use of an over-running clutch pulley instead of the conventional driven pulley. An over-running clutch pulley allows the pulley to continue to rotate at the same rotational speed and in a same rotational direction after a sudden deceleration of the drive belt. In a way, the over-running clutch pulley functions like the rear hub of a typical bicycle; the rear hub and rear wheel of a conventional bicycle continue to rotate at the same rotational speed and in the same rotational direction even after a sudden deceleration of the pedals and crankshaft of the bicycle. An example of an over-running clutch pulley is described in U.S. Pat. No. 5,598,913 issued to the same assignee of this invention and hereby incorporated in its entirety by this reference.

Since many customers of new automobiles are demanding longer lives, with relatively fewer repairs, for their new automobiles, there is a need in the automotive field, if not in other fields, to create an over-running clutch pulley with increased wear resistance. While forming or treating the entire over-running clutch pulley to have a specific surface microhardness will resist wear of the over-running clutch pulley, these processes may increase the costs and, in some cases, the weight of the over-running clutch pulley. This invention provides an over-running clutch pulley with features intended to increase wear resistance, while minimizing the costs and weight of the over-running clutch pulley.

DETAILED DESCRIPTION OF THE PREFERRED EMBODIMENTS

The following description of three preferred embodiments of the invention is not intended to limit the scope of this invention to these preferred embodiments, but rather to enable any person skilled in the art of over-running clutches to make and use this invention.

Figure 1:
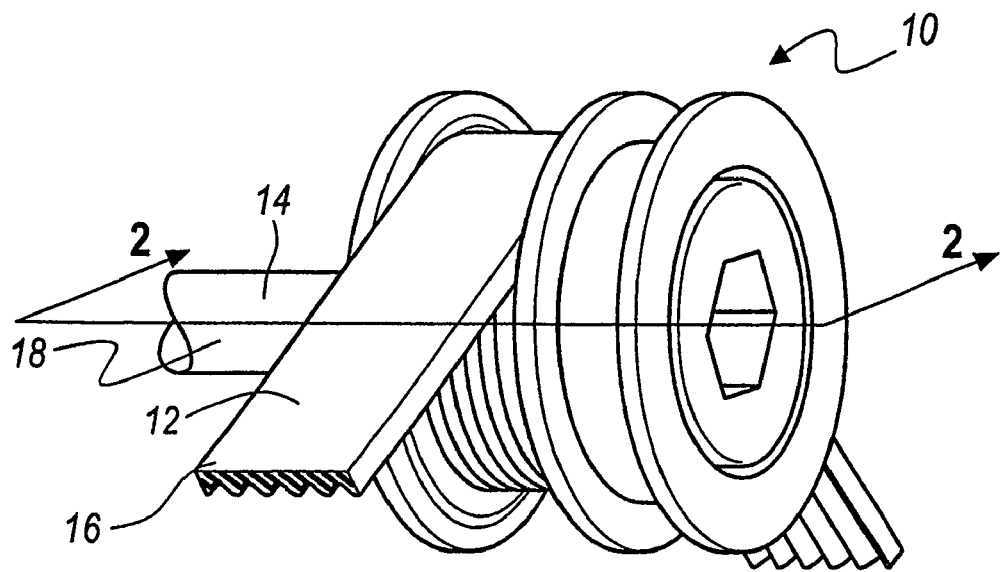
FIG. 1 is a perspective view of an over-running clutch pulley of the invention, shown with a drive belt as the input device and a cylindrical shaft as the output device.

As shown in FIG. 1, the invention includes an over-running clutch pulley 10 for rotationally engaging an input device 12 and an output device 14. The over-running clutch pulley 10 has been designed for use with a drive belt 16 as the input device 12, and with a cylindrical shaft 18 as the output device 14. More specifically, the over-running clutch pulley 10 has been particularly designed for use with a drive belt 16 with a grooved surface and a cylindrical shaft 18 of an automotive alternator. The over-running clutch pulley 10 may be used, however, in other environments, with other suitable input devices, such as smooth belt, a toothed belt, a V-shaped belt, or even a toothed gear, and with other suitable output devices, such as a polygonal shaft. Furthermore, the over-running clutch pulley 10 may be used in an environment with two devices that alternate their rotational input responsibilities, and in an environment with an "output device" that actually provides rotational input and with an "input device" that actually receives rotational input. In these alternative embodiments, the terms "input device" and "output device" are interchangeable.

Figure 2:
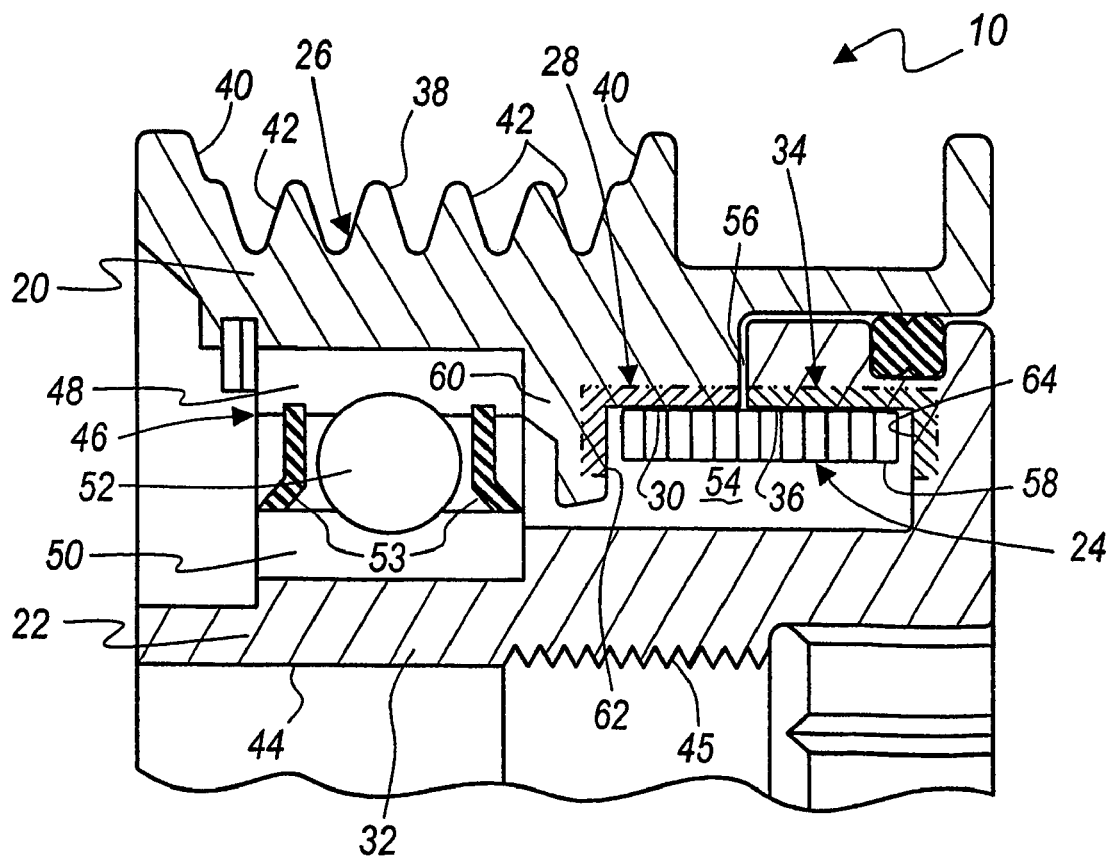
FIG. 2 is a partial cross-section view, taken along the line 2—2 of FIG. 1, of the over-running clutch pulley of a first preferred embodiment.

As shown in FIG. 2, the over-running clutch pulley 10 of the preferred embodiment includes a sheave member 20, a hub member 22 located substantially concentrically within the sheave member 20, and a clutch member 24, which cooperate to rotationally engage the drive belt and the cylindrical shaft. The sheave member 20 preferably includes a sheave input section 26 adapted to the engage the input device, and a sheave clutch section 28 defining a sheave clutch surface 30. Similarly, the hub member 22 preferably includes a hub output section 32 adapted to engage the output device, and a hub clutch section 34 defining a hub clutch surface 36. In the preferred embodiment, either the sheave clutch surface 30, the hub clutch surface 36, or both, have a surface microhardness greater than the hub output section 32, which increase wear resistance for the over-running clutch pulley 10, while minimizing cost and weight. The over-running clutch pulley of alternative embodiments may include other elements, such as a sealing member to substantially prevent passage of dirt into and grease out of the over-running clutch pulley, or any other suitable elements that do not substantially interfere with the functions of the sheave member, the hub member, and the clutch member.

The sheave input section 26 of the sheave member 20 of the preferred embodiment functions to engage the drive belt. To substantially prevent rotational and axial slippage of the sheave member 20 and the drive belt, the sheave input section 26 preferably defines a sheave input surface 38 with two sheave input shoulders 40 and at least one sheave input groove 42. The sheave input section 26 may alternatively define other suitable surfaces, such as toothed surfaces or ribbed surfaces, to engage the input device. The sheave input surface 38 is preferably outwardly directed (away from the rotational axis of the over-running clutch pulley 10) and is preferably substantially cylindrically shaped. The sheave input section 26 is preferably made from conventional structural materials, such as steel, and with conventional methods, but may alternatively be made from other suitable materials (as described below) and from other suitable methods.

The hub output section 32 of the hub member 22 of the preferred embodiment functions to engage the cylindrical shaft. The hub output section 32 preferably defines a hub output surface 44 with a smooth section (which functions to ease and center the assembly of the over-running clutch pulley 10 onto the cylindrical shaft), a threaded section 45 (which functions to substantially prevent rotation and to axially retain the hub member 22 to the cylindrical shaft), and a hexagonal section (which functions to mate with an alien wrench for easy tightening and loosening of the over-running clutch pulley 10 onto and off of the cylindrical shaft). Of course, the hub output section 32 may include other suitable devices or define other surfaces to prevent rotational and axial slippage, to engage the cylindrical shaft, and to engage a tool for tightening or loosening the over-running clutch pulley 10 onto and off of the cylindrical shaft. The hub output surface 44 is preferably inwardly directed (toward the rotational axis of the over-running clutch pulley 10) and is preferably substantially cylindrically shaped. The hub output section 32 is preferably made from conventional structural materials, such as steel, and with conventional methods, but may alternatively be made from other suitable materials (as described below) and from other suitable methods.

The over-running clutch pulley 10 of the preferred embodiment also includes a bearing member 46, which functions to allow relative rotational movement of the sheave member 20 and the hub member 22. The bearing member 46, which is preferably a rolling element type, preferably includes an outer race element 48 preferably press-fit mounted on the sheave member 20, an inner race element 50 preferably press-fit mounted on the hub member 22, ball bearing elements 52 preferably located between the outer race element 48 and the inner race element 50, and bearing seals 53 preferably extending between the outer race element 48 and the inner race element 50 on either side of the ball bearing elements 52. The bearing member 46 may alternatively be of other suitable types, such as a journal bearing or a roller bearing, may alternatively include other suitable elements, and may alternatively be mounted in other suitable manners. The bearing member 46 is a conventional device and, as such, is preferably made from conventional materials and with conventional methods, but may alternatively be made from other suitable materials and with other suitable methods.

The sheave clutch section 28 and the hub clutch section 34 of the preferred embodiment function to provide the sheave clutch surface 30 and the hub clutch surface 36, respectively, for the engagement with the clutch member 24. The sheave clutch section 28 preferably extends radially inward from the sheave member 20. In this manner, the sheave clutch section 28 is preferably made from the same material and with the same methods as the sheave input section 26, but may alternatively be made from other suitable materials and with other suitable methods (as described below). The hub clutch section 34 preferably extends radially outward from and axially over the hub output section 32. In this manner, the hub clutch section 34 is preferably made from the same material and with the same methods as the hub output section 32, but may alternatively be made from other suitable materials and with other suitable methods (as described below). The hub clutch section 34 preferably partially defines a closed clutch cavity 54 to contain the clutch member 24.

In the preferred embodiment, the sheave clutch surface 30 and the hub clutch surface 36 are located substantially adjacent with an axial gap 56 between each other. The sheave clutch surface 30 and the hub clutch surface 36 are preferably inwardly directed (toward the rotational axis of the over-running clutch pulley 10) and are preferably substantially cylindrically shaped. Furthermore, the sheave clutch surface 30 and the hub clutch surface 36 preferably have a similar radial diameter, a similar axial length, and a similar smooth finish. These features allow optimum performance of the clutch member 24. The sheave clutch surface 30 and the hub clutch surface 36 may alternatively have differences with each other on these, or other, design specifications.

The clutch member 24 of the preferred embodiment functions to engage the sheave clutch surface 30 and the hub clutch surface 36 upon the acceleration of the sheave member 20 in a first rotational direction relative to the hub member 22, and to disengage the sheave clutch surface 30 and the hub clutch surface 36 upon the deceleration of the sheave member 20 in the first rotational direction relative to the hub member 22. In the preferred embodiment, the clutch member 24 is a coil spring 58. The coil spring 58, which is made from conventional materials and with conventional methods, accomplishes the above features by the particular size and orientation of the coil spring 58 within the closed clutch cavity 54. In alternative embodiments, the clutch member 24 may include other suitable devices that accomplish the above features.

The coil spring 58 is preferably designed with a relaxed spring radial diameter that is sized slightly greater than an inner diameter of the sheave clutch surface 30 and the hub clutch surface 36. Thus, when inserted into the closed clutch cavity 54 and when experiencing no rotational movement of the sheave member 20 or the hub member 22, the coil spring 58 frictionally engages with and exerts an outward force on both the sheave clutch surface 30 and the hub clutch surface 36. Further, the coil spring 58 is preferably oriented within the closed clutch cavity 54 such that the coils extend axially in the first rotational direction from the sheave clutch surface 30 to the hub clutch surface 36. With this orientation, relative rotational movement of the sheave member 20 and the hub member 22 will result in an unwinding or winding of the spring member. In other words, acceleration of the sheave member 20 in the first rotational direction relative to the hub member 22 will bias an unwinding of the coil spring 58 and deceleration of the sheave member 20 in the first rotational direction relative to the hub member 22 will bias a winding of the coil spring 58.

The unwinding of the coil spring 58 tends to increase the outward force of the coil spring 58 on the sheave clutch surface 30 and the hub clutch surface 36, thereby providing engagement, or "lock", of the sheave member 20 and the hub member 22. This engagement condition preferably occurs upon the acceleration of the sheave member 20 in the first rotational direction relative to the hub member 22. On the other hand, the winding of the coil spring 58 tends to decrease the outward force of the coil spring 58 on the sheave clutch surface 30 and the hub clutch surface 36, thereby allowing disengagement, or "slip", of the sheave member 20 and the hub member 22. This disengagement condition preferably occurs upon the deceleration of the sheave member 20 in the first rotational direction relative to the hub member 22.

During the "slip" condition of the over-running clutch pulley 10, the coil spring 58 will lightly rub across the sheave clutch surface 30 or the hub clutch surface 36, which may cause wear of these surfaces. Similarly, during the "lock" condition of the over-running clutch pulley 10, the coil spring 58 will forcefully engage with the sheave clutch surface 30 and the hub clutch surface 36, which may also cause wear of these surfaces. To resist the wear of these surfaces; the sheave clutch surface 30 and the hub clutch surface 36 are preferably formed or treated to have a sufficient surface microhardness value.

The term "surface microhardness" refers to a surface property as preferably measured by the Rockwell Hardness 'C' standard. In some cases, however, the surface may be treated or coated and a measurement under the Rockwell Hardness 'C' standard will "puncture" through the treatment or coating. In these cases, the surface microhardness value is preferably measured at ½ the distance of the surface treatment or coating.

Since the rest of the over-running clutch pulley 10 does not have to be formed or treated to have such surface microhardness, the sheave clutch surface 30 and the hub clutch surface 36 preferably have an increased surface microhardness relative to the rest of the over-running clutch pulley 10. More specifically, the sheave clutch surface 30 and the hub clutch surface 36 preferably have a surface microhardness greater than the hub output section 32, and equivalent to or greater than 50 Rockwell Hardness 'C' ("$R_c$"). This specific surface microhardness resists wear of the over-running clutch pulley 10, while the difference between the surface microhardness of theses surfaces and the rest of the over-running clutch pulley 10 reduces costs and, in some cases, reduces weight. Although the preferred embodiments describe an increased surface microhardness of the sheave clutch surface 30 and the hub clutch surface 36, alternative embodiments may include an increased microhardness of only one of the sheave clutch surface 30 and the hub clutch surface 36.

The increased surface microhardness may be accomplished with several different structures and methods. In the first preferred embodiment of the invention, the increase is accomplished by treating the sheave clutch surface 30 of the sheave clutch section 28 and the hub clutch surface 36 of the hub clutch section 34. The treatment preferably includes diffusing carbon into the sheave clutch surface 30 and the hub clutch surface 36. This preferred treatment, commonly known as carburizing, is well known in the metallurgical field. The increased surface microhardness may alternatively be accomplished by other suitable treatments, either in combination with or as substitution for the preferred treatment. These other suitable methods may include carbonitriding (similar to carburizing, except for the small addition of nitrogen in the atmosphere and the small reduction in temperature), induction heat treatment, radiant heat treatment, laser cladding, and chemical or electroplating deposition. The use of the preferred treatment preferably provides the sheave clutch surface 30 and the hub clutch surface 36 having a surface microhardness greater than the hub output section 32, and equivalent to or greater than 50 $R_c$.

Figure 3:
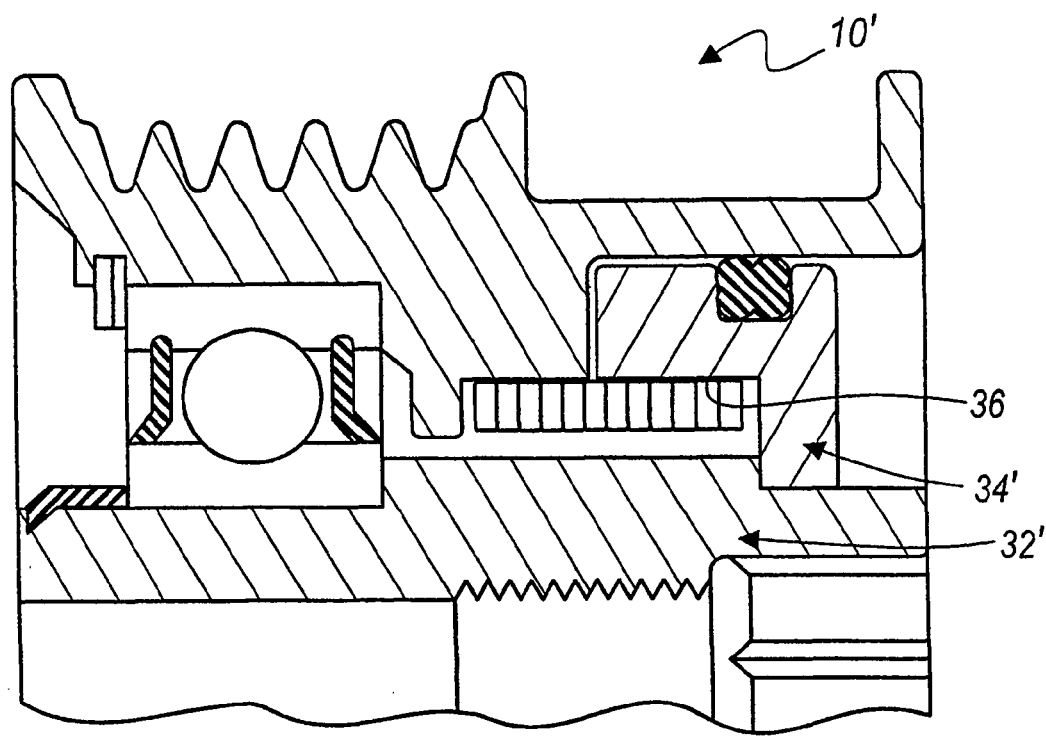
FIG. 3 is a partial cross-section view, similar to FIG. 2, of the over-running clutch pulley of a second preferred embodiment.

As shown in FIG. 3, the increased surface microhardness is accomplished in the over-running clutch pulley 10' of the second preferred embodiment by separately forming and later connecting the hub clutch section 34' and the hub output section 32'. The hub clutch section 34' may be treated using a suitable method, such as carbonitriding, while the hub output section 32' may be left untreated. The hub clutch section 34' is preferably connected to the hub output section 32' with a mechanical fastener (not shown), but may alternatively be connected with any other suitable device or method. The use of this method preferably provides the hub clutch surface 36 having a surface microhardness greater than the hub output section 32', and equivalent to or greater than 50 $R_c$. Although the second preferred embodiment only describes the two-piece nature of the hub clutch section 34' and the hub output section 32', an alternative embodiment of the invention may include separately forming and later connecting the sheave clutch section 28 and the sheave input section 26.

Figure 4:
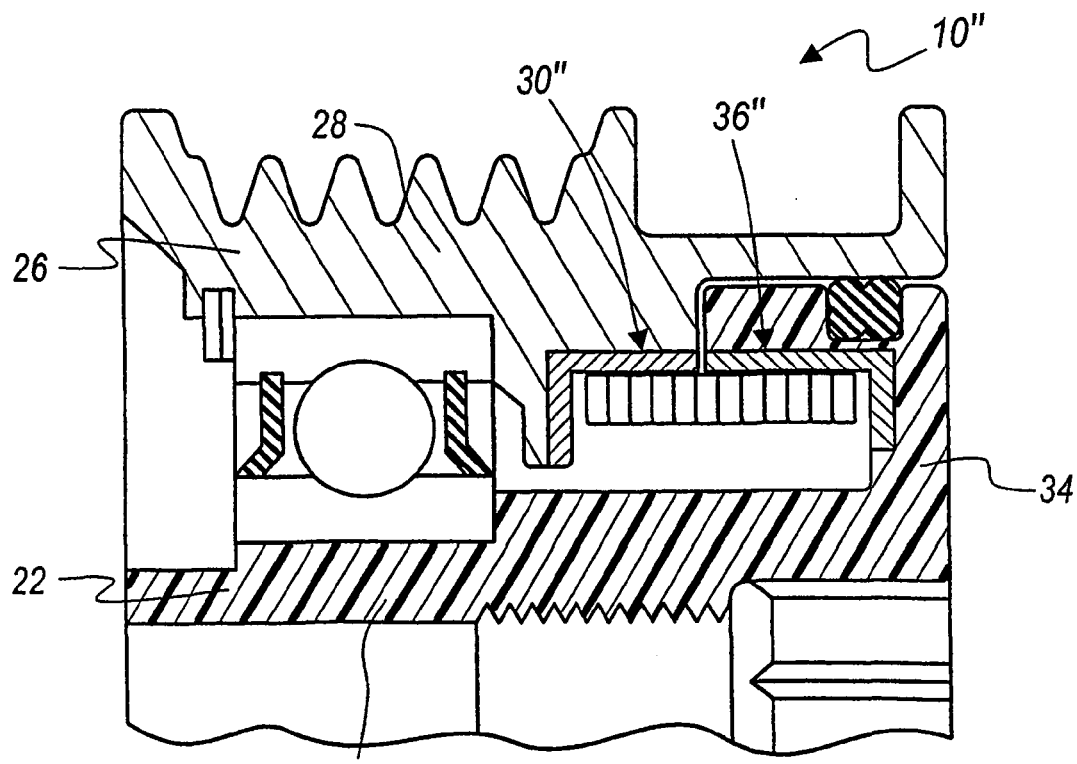
FIG. 4 is a partial cross-section view, similar to FIG. 2, of the over-running clutch pulley of a third preferred embodiment.

As shown in FIG. 4, the increased surface microhardness is accomplished in the over-running clutch pulley 10" of the third preferred embodiment by separately forming and later connecting the sheave clutch surface 30" and the sheave clutch section 28, and by separately forming and later connecting the hub clutch surface 36" and the hub clutch section 34. Like the method of the second preferred embodiment, the sheave clutch surface 30" and the hub clutch surface 36" may be treated using a suitable method, such as carbonitriding, while the remaining portions of the sheave clutch section 28 and the hub clutch section 34 may be left untreated. In this embodiment, however, the sheave clutch surface 30" and the hub clutch surface 36" are preferably made from a metallic material, such as steel, while the remaining portions of the sheave clutch section 28, the sheave input section 26, the hub clutch section 34, and the hub output section 32 are preferably made from a non-hardened steel, or even a non-metallic material. The sheave clutch surface 30" and the hub clutch surface 36" are preferably coupled to the sheave clutch section 28 and the hub clutch section 34 by a press fit arrangement, but may alternatively be connected with adhesive bonds, mechanical fasteners, molding processes, or any other suitable device or method. In the third preferred embodiment, the sheave clutch surface 30" and the hub clutch surface 36" are made from steel, while the remaining portions are made from plastic. In alternative embodiments, however, the sheave clutch surface 30" and the hub clutch surface 36" may be made from any suitable material such that they have a surface microhardness greater than the hub output section 32 of the hub member 22, and equivalent to or greater than 50 $R_c$.

As shown in FIG. 2, to insure the proper placement of the spring member within the closed clutch cavity 54, the sheave member 20 of the preferred embodiment includes a sheave collar section 60 defining a sheave collar surface 62, and the hub clutch section 34 of the preferred embodiment defines a hub flange surface 64. The sheave collar section 60 preferably extends radially inward from the sheave input section 26 and adjacent the sheave clutch section 28. The sheave collar surface 62 and the hub flange surface 64 are preferably located on opposite ends of the closed clutch cavity 54. In this manner, the sheave collar surface 62 and the hub flange surface 64 cooperate with the sheave clutch surface 30 and the hub clutch surface 36 to actually define the closed clutch cavity 54. The over-running clutch pulley 10 of the preferred embodiment may, of course, use other suitable devices to insure the proper placement of the spring member within the closed clutch cavity 54. These devices may be surfaces defined by other sections of the sheave member 20 or the hub member 22, or surfaces defined by other suitable elements. In the same manner as the sheave clutch surface 30 and the hub clutch surface 36, the sheave collar surface 62 and the hub flange surface 64 preferably have a surface microhardness greater than the hub output section 32, and equivalent to or greater than 50 $R_c$. This increased surface microhardness, which further resists wear of the over-running clutch pulley 10, are preferably accomplished by one of the structures and methods as described above for the sheave clutch surface 30 and the hub clutch surface 36, but may alternatively be accomplished by any other suitable structure or method.

As any person skilled in the art of over-running clutches will recognize from the previous detailed description and from the figures and claims, modifications and changes can be made to the preferred embodiments of the invention without departing from the scope of this invention defined in the following claims.

We claim:

1. An over-running clutch pulley for rotationally engaging an input device and an output device, comprising:
    a sheave member including a sheave input section, a sheave clutch section and sheave clutch surface, the sheave input section adapted to the engage the input device, said sheave input section and said sheave clutch section being unitarily formed together as one piece;
    a hub member located substantially concentrically within said sheave member and including a hub output section, a hub clutch section and a hub clutch surface, the hub output section adapted to engage the output device, the hub clutch surface being located substantially adjacent said sheave clutch surface, said hub output section and said hub clutch section being unitarily formed together as one piece;
    a clutch member adapted to engage said sheave clutch surface and said hub clutch surface upon the acceleration of said sheave member in a first rotational direction relative to said hub member, and to disengage said sheave clutch surface and said hub clutch surface upon the deceleration of said sheave member in the first rotational direction relative to said hub member;
    wherein one of said sheave clutch surface and said hub clutch surface is a surface having diffused carbon therein and has a surface microhardness greater than said hub output section.

2. The over-running clutch pulley of claim 1 wherein said sheave input section defines a sheave input surface with two sheave shoulders and at least one sheave input groove that cooperate to engage a drive belt as the input device and to substantially prevent rotational and axial slippage between said sheave input surface and the drive belt.

3. The over-running clutch pulley of claim 1 wherein said sheave clutch surface has a surface microhardness greater than said hub output section.

4. The over-running clutch pulley of claim 3 wherein said sheave clutch surface has a surface microhardness value equivalent to or greater than 50 $R_C$.

5. The over-running clutch pulley of claim 3 wherein said sheave clutch surface is inwardly directed and substantially cylindrically shaped.

6. The over-running clutch pulley of claim 1 wherein said sheave clutch surface is defined by an insert and said sheave input section is made from a non-metallic material.

7. The over-running clutch pulley of claim 1 wherein said sheave member further includes a sheave collar section defining a sheave collar surface having a surface microhardness greater than said hub output section, and wherein said sheave clutch section and said sheave collar section cooperate to substantially define a clutch cavity adapted to contain said clutch member.

8. The over-running clutch pulley of claim 7 wherein said sheave collar surface has a surface microhardness value equivalent to or greater than 50 $R_C$.

9. The over-running clutch pulley of claim 1 further comprising a bearing member located between said sheave member and said hub member, and adapted to allow relative rotational movement of said sheave member and said hub member.

10. The over-running clutch pulley of claim 1 wherein said hub output section defines a hub output surface adapted to engage a cylindrical shaft as the output device.

11. The over-running clutch pulley of claim 10 wherein said hub clutch surface has a surface microhardness value equivalent to or greater than 50 $R_C$.

12. The over-running clutch pulley of claim 10 wherein said hub clutch surface is inwardly directed and substantially cylindrically shaped.

13. The over-running clutch pulley of claim 1 wherein said hub clutch surface has a surface microhardness greater than said hub output section.

14. The over-running clutch pulley of claim 1 wherein said hub clutch section is made from a metallic material.

15. The over-running clutch pulley of claim 1 wherein said hub clutch surface is defined by an insert and said hub output section is made from a non-metallic material.

16. The over-running clutch pulley of claim 1 wherein said hub clutch section further defines a hub flange surface having a surface microhardness greater than said hub output section, and wherein said hub clutch surface and said hub flange surface cooperate to substantially define a clutch cavity adapted to contain said clutch member.

17. The over-running clutch pulley of claim 16 wherein said hub flange surface has a surface microhardness value equivalent to or greater than 50 $R_C$.

18. A method of manufacturing an over-running clutch pulley for rotationally engaging an input device and an output device, comprising:
   providing a sheave member including a sheave input section and a sheave clutch section and a sheave clutch surface, the sheave input section and the sheave clutch section being unitarily formed as one piece; and adapting the sheave input section to the engage the input device;
   providing a hub member including a hub output section and a hub clutch section defining a hub clutch surface, the hub clutch section and hub output section being unitarily formed as one piece; adapting the hub output section to engage the output device;
   surface treating by diffusing carbon into the surface of one of the sheave clutch surface and the hub clutch surface to have a surface microhardness greater than the hub output section;
   locating the hub member substantially concentrically within the sheave member and the sheave clutch surface substantially adjacent the hub clutch surface; and
   providing a clutch member; and adapting the clutch member to engage the sheave clutch surface and the hub clutch surface upon the acceleration of the sheave member in a first rotational direction relative to the hub member, and to disengage the sheave clutch surface and the hub clutch surface upon the deceleration of the sheave member in the first rotational direction relative to the hub member.

19. The method of claim 18 further comprising treating the sheave clutch surface to have a surface microhardness greater than the hub output section.

20. The method of claim 19 further comprising treating the sheave clutch surface to have a surface microhardness value equivalent to or greater than 50 $R_C$.

21. The method of claim 18 further comprising treating the hub clutch surface to have a surface microhardness greater than the hub output section.

22. The method of claim 21 further comprising treating the hub clutch surface to have a surface microhardness value equivalent to or greater than 50 $R_C$.

* * * * *

UNITED STATES PATENT AND TRADEMARK OFFICE
CERTIFICATE OF CORRECTION

PATENT NO. : 7,191,880 B2  Page 1 of 1
APPLICATION NO. : 10/381773
DATED : March 20, 2007
INVENTOR(S) : Mary-Jo Liston et al.

It is certified that error appears in the above-identified patent and that said Letters Patent is hereby corrected as shown below:

In the Claims

Column 9, in claim 18, line 5, delete "section and a sheave" and substitute --section, a sheave-- in its place.

Column 9, in claim 18, line 10, immediately after "output section" insert --,-- (comma).

Column 9, in claim 18, line 11, delete "and a hub clutch section defining" and substitute --a hub clutch section and-- in its place.

Signed and Sealed this

Twenty-sixth Day of June, 2007

JON W. DUDAS
*Director of the United States Patent and Trademark Office*